(12) United States Patent
Yamano et al.

(10) Patent No.: US 10,795,486 B2
(45) Date of Patent: Oct. 6, 2020

(54) INPUT APPARATUS, INPUT METHOD AND PROGRAM

(71) Applicant: SONY CORPORATION, Tokyo (JP)

(72) Inventors: Ikuo Yamano, Tokyo (JP); Yusuke Miyazawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/370,089

(22) Filed: Mar. 29, 2019

(65) Prior Publication Data

US 2019/0227662 A1 Jul. 25, 2019

Related U.S. Application Data

(63) Continuation of application No. 15/484,533, filed on Apr. 11, 2017, now Pat. No. 10,275,066, which is a
(Continued)

(30) Foreign Application Priority Data

Sep. 7, 2009 (JP) .................................. 2009-206463

(51) Int. Cl.
*G06F 3/041* (2006.01)
*G06F 3/023* (2006.01)
(Continued)

(52) U.S. Cl.
CPC .......... *G06F 3/0414* (2013.01); *G06F 3/0237* (2013.01); *G06F 3/044* (2013.01); *G06F 3/0488* (2013.01); *G06F 3/04886* (2013.01)

(58) Field of Classification Search
CPC .... G06F 3/0237; G06F 3/0412; G06F 3/0414; G06F 3/044; G06F 3/0488; G06F 3/04886; G06F 2203/04809
See application file for complete search history.

(56) References Cited

U.S. PATENT DOCUMENTS 5,675,329 A 10/1997 Barker et al.
6,429,846 B2 * 8/2002 Rosenberg .......... G06F 3/03545
345/156
(Continued)

FOREIGN PATENT DOCUMENTS

CN 1185844 A 6/1998
EP 2000896 A2 12/2008
(Continued)

OTHER PUBLICATIONS

Merriam-Websters_Collegiate_Dictionary_Tenth Edition_1997_page_936.

*Primary Examiner* — Mihir K Rayan
(74) *Attorney, Agent, or Firm* — Paratus Law Group, PLLC

(57) ABSTRACT

There is provided an input apparatus including: a pressure detecting unit which detects press pressure of an operational body applied to a virtual key having one or more input candidates allocated selectively; and an input control unit which varies a selection state of the one or more input candidates selectively allocated to the virtual key for every pressing operation having, as a single time of pressing operation, timing that the press pressure detected by the pressure detecting unit exceeds a predetermined selection threshold value or timing that the press pressure becomes smaller than the selection threshold value as being attenuated after exceeding the selection threshold value.

19 Claims, 16 Drawing Sheets

Related U.S. Application Data continuation of application No. 12/841,686, filed on Jul. 22, 2010, now Pat. No. 9,652,067.

(51) Int. Cl.
    *G06F 3/0488*      (2013.01)
    *G06F 3/044*      (2006.01)

(56) References Cited

U.S. PATENT DOCUMENTS

| | | | |
|---|---|---|---|
| 6,504,530 | B1 | 1/2003 | Wilson et al. |
| 6,616,703 | B1 | 9/2003 | Nakagawa |
| 6,940,494 | B2 | 9/2005 | Hoshino et al. |
| 7,177,797 | B1 | 2/2007 | Micher et al. |
| 8,446,383 | B2 | 5/2013 | Miyazawa et al. |
| 9,086,755 | B2 * | 7/2015 | Cho .................. G06F 3/0416 |
| 9,652,067 | B2 * | 5/2017 | Yamano ............. G06F 3/0237 |
| 2004/0021643 | A1 * | 2/2004 | Hoshino ............. G06F 3/016 345/173 |
| 2005/0162395 | A1 | 7/2005 | Unruh |
| 2006/0053387 | A1 * | 3/2006 | Ording .............. G06F 3/0414 715/773 |
| 2006/0132457 | A1 * | 6/2006 | Rimas-Ribikauskas ............ G06F 3/04842 345/173 |
| 2006/0161846 | A1 * | 7/2006 | Van Leeuwen ..... G06F 3/04842 715/702 |
| 2007/0205990 | A1 | 9/2007 | Gloyd et al. |
| 2008/0295015 | A1 | 11/2008 | Liu et al. |
| 2008/0303799 | A1 * | 12/2008 | Schwesig ............ G06F 3/0414 345/173 |
| 2008/0316183 | A1 | 12/2008 | Westerman et al. |
| 2009/0051667 | A1 * | 2/2009 | Park .................... G06F 3/04886 345/173 |
| 2009/0237374 | A1 | 9/2009 | Li et al. |
| 2009/0322695 | A1 * | 12/2009 | Cho .................... G06F 3/0416 345/173 |
| 2009/0327939 | A1 | 12/2009 | Johns et al. |
| 2010/0039393 | A1 | 2/2010 | Pratt et al. |
| 2010/0156807 | A1 | 6/2010 | Stallings et al. |
| 2010/0208158 | A1 | 8/2010 | Chen et al. |
| 2010/0220065 | A1 | 9/2010 | Ma |
| 2010/0238115 | A1 * | 9/2010 | Komaarashi ........... G06F 3/016 345/168 |
| 2010/0241993 | A1 | 9/2010 | Chae |

FOREIGN PATENT DOCUMENTS

| | | |
|---|---|---|
| JP | 10-171600 | 6/1998 |
| JP | 11-119882 | 4/1999 |
| JP | 2002-207555 | 7/2002 |
| JP | 2002-366277 | 12/2002 |
| JP | 2003-157144 | 5/2003 |
| JP | 2003-316500 | 11/2003 |
| JP | 2004-054589 | 2/2004 |
| JP | 2004-177994 | 6/2004 |
| JP | 2006-107140 | 4/2006 |
| JP | 2008-305174 | 12/2008 |
| JP | 2009-054135 | 3/2009 |
| WO | WO2004/057844 A1 | 7/2004 |
| WO | WO2008/103018 A1 | 8/2008 |
| WO | WO2009/026052 A2 | 2/2009 |

* cited by examiner

INPUT APPARATUS, INPUT METHOD AND PROGRAM

CROSS-REFERENCE TO PRIOR APPLICATION

This application is a continuation of U.S. patent application Ser. No. 15/484,533 (filed on Apr. 11, 2017), which is a continuation of U.S. patent application Ser. No. 12/841,686 (filed on Jul. 22, 2010 and issued as U.S. Pat. No. 9,652,067 on May 16, 2017), which claims priority to Japanese Patent Application No. 2009-206463 (filed on Sep. 7, 2009), which are all hereby incorporated by reference in their entirety.

BACKGROUND OF THE INVENTION

Field of the Invention

The present invention relates to an input apparatus, an input method and a program. More specifically, the present invention relates to an input apparatus, an input method and a program to control input candidates based on pressing operation against a displayed virtual key.

Description of the Related Art

A hardware keyboard to input characters is frequently mounted on a personal digital assistant such as a cellular phone and a smart phone, and a remote control device for a personal computer, a car navigation system and the like. Hardware keyboards are classified into a type having, single selection information allocated to one key as a normal QWERTY keyboard (hereinafter, called a keyboard of a single selection type) and a type having, plural selection information allocated to one key as a numerical keypad to perform Japanese character inputting or alphabetical character inputting (hereinafter, called a keyboard of a plural selection type).

In recent years, devices to perform character inputting as displaying a software keyboard on a display screen instead of a hardware keyboard eliminated from the devices targeting miniaturization, cost reduction, ruggedization and design enhancement of the devices are becoming popular. In such cases, a touch panel or a touch-pad to detect touch-input or pen-input of an operator onto the display screen is frequently arranged at the devices. For example, as illustrated in FIG. 1, in the case of operating a software keyboard 18 of a plural selection type, an operator is required to continuously tap a display screen to switch a selection state of one virtual key 18b such as the order of "A", "B" and "C". With continuous pressing by tapping, input operation is controlled by detecting contact and non-contact to the display screen. Accordingly, with the continuous pressing utilizing a software keyboard, the operator is required to get his/her finger separated every time from the display screen. When a hardware keyboard is utilized, an operator can perform continuous pressing as maintaining his/her finger contacted to a key. Therefore, input operation with a software keyboard puts a heavier burden on an operator and is more difficult to be performed rapidly compared to a case with a hardware keyboard.

Further, in the case that characters allocated to the same virtual key 18c are continuously input as "E" and "E", it is required to perform determination operation with another determination button for proceeding to the next input after selecting the first character by tapping. Therefore, inputting is not efficiently performed.

Further, also in the case to vary a state of selected characters such as transform of "KA" to "GA" and "a" to "A", it is required to press a separately-arranged transform button and the like. This requirement causes decrease in input efficiency. Two issues described above have been common issues during operation of a hardware keyboard of the plural selection type in the related art.

In addition, since tactual feedback may not be obtained with a software keyboard utilizing a touch panel or a touch-pad compared to operation with a hardware keyboard, there has been an issue that typing errors increase.

To address the issues, there has been proposed a method to detect press pressure applied to a virtual key of a software keyboard by utilizing a pressure-sensitive sensor as mounting the pressure-sensitive sensor on a device and to perform key inputting while obtaining tactual feedback by utilizing the press pressure (for example, see Japanese Patent Application Laid-Open No. 11-119882). With the operation method disclosed in Japanese Patent Application Laid-Open No. 11-119882, only kana characters on the top line of the Japanese syllabary ("A", "KA", "SA", "TA", "NA", "HA", "MA", "YA", "RA", "WA") are allocated respectively to a virtual key. When a specific character (for example, "NA") is touched from the top line kana characters, grouped kana characters (for example, "NA", "NI", "NU", "NE", "NO") belonging to the top line kana character of the touched virtual key arc displayed. In Japanese Patent Application Laid-Open No. 11-119882, pressure threshold values are arranged stepwise to select each of the grouped kana characters and press pressure of the virtual key by an operational body is compared to the pressure threshold values arranged stepwise, so that any of the grouped kana characters belonging to the touched virtual key is selected. In this manner, the movement amount of a hand and a sight line of an operator can be reduced during inputting.

SUMMARY OF THE INVENTION

However, with the operation method disclosed in Japanese Patent Application Laid-Open No. 11-119882, the operator is required stepwise adjustment of the press pressure in order to select a desired grouped kana character. Since it is difficult to adjust the press amount of a finger, character selection errors may occur. In addition, since the press amount is adjusted stepwise while continuously pressing the display screen with the finger, a heavy burden is placed on the finger.

In light of the foregoing, it is desirable to provide an input apparatus, an input method and a program capable of being operated efficiently and rapidly with desirable press operation.

According to an embodiment of the present invention, there is provided an input apparatus including: a pressure detecting unit which detects press pressure of an operational body applied to a virtual key having one or more input candidates allocated selectively; and an input control unit which varies a selection state of the one or more input candidates selectively allocated to the virtual key for every pressing operation having, as a single time of pressing operation, timing that the press pressure detected by the pressure detecting unit exceeds a predetermined selection threshold value or timing that the press pressure becomes smaller than the selection threshold value as being attenuated after exceeding the selection threshold value.

With the above configuration, the selection state of one or more input candidates selectively allocated to the virtual key is varied for every pressing operation having, as a single time of pressing operation, the timing that press pressure exceeds a selection threshold value or the timing that the press pressure becomes smaller than the selection threshold value as being attenuated after exceeding the selection threshold value. Accordingly, a desired character can be selected and determined out of characters varied only with simple press operation. Consequently, efficiency and speed of the input operation can be enhanced by eliminating excessive movement of a finger in the related art, such as operation to press a determination button, operation to repeat contact and non-contact to a virtual key, and stepwise press operation which is difficult to be performed, in a situation that characters allocated to the same virtual key are to be continuously input.

The input apparatus further including: a displaying unit which displays the virtual key, and the pressure detecting unit may be arranged at a display screen of the displaying unit and detects press pressure of an operational body applied to the display screen.

The input control unit may determine selection of an input candidate being in a selection state at that time when determination operation by the operational body is judged being performed based on the detected press pressure.

The input control unit may judge that determination operation by the operational body is performed at any of the timing when press pressure by the operational body is judged not being detected, the timing when the press pressure is judged being equal to or smaller than a determination threshold value which is smaller than the selection threshold value, and the timing when a predetermined time passes after the press pressure is judged being equal to or smaller than the determination threshold value.

A position detecting unit may be arranged at the display screen and detects a contact position of the operational body, and the input control unit may vary a selection state to another input candidate relating to the input candidate which is in a selection state at that time corresponding to a direction of contact position variation when the contact position detected by the position detecting unit is judged being out of an operational area of the virtual key while maintaining the detected press pressure equal to or larger than the selection threshold value.

The input control unit may select one or more input candidate groups selected by repeating determining selection of an input candidate being in a selection state at that time every time when determination operation by the operational body is judged being performed.

The input control unit may switch from an input selection mode for selecting the input candidate group to a predictive transform selection mode for selecting a predictive transform candidate relating to the selected input candidate group when the detected press pressure is judged being equal to or larger than a transform threshold value which is larger than the selection threshold value.

The input control unit may vary a selection state of the predictive transform candidate for every pressing operation in the predictive transform selection mode.

The input control unit may determine to input the predictive transform candidate which is in a selection state at that time when the determination operation by the operational body is judged being performed based on the detected press pressure in the predictive transform selection mode.

The displaying unit may display a preview of the input candidate which is in a selection state at that time when the detected press pressure is judged being equal to or larger than a predetermined display threshold value.

The displaying unit may vary a displaying state of the input candidate corresponding to variation of detected press pressure.

The displaying unit may display a preview of the input candidate in a size being proportional to magnitude of the detected press pressure.

According to another embodiment of the present invention, there is provided an input method including steps of detecting press pressure of an operational body applied to a virtual key having one or more input candidates allocated selectively by a pressure sensor; and varying a selection state of the one or more input candidates selectively allocated to the virtual key for every pressing operation having, as a single time of pressing operation, timing that the press pressure detected by the pressure sensor exceeds a predetermined selection threshold value or timing that the press pressure becomes smaller than the selection threshold value as being attenuated after exceeding the selection threshold value.

According to another embodiment of the present invention, there is provided a program for causing a computer to execute processes of: detecting press pressure of an operational body applied to a virtual key having one or more input candidates allocated selectively by a pressure sensor; and varying a selection state of the one or more input candidates selectively allocated to the virtual key for every pressing operation having, as a single time of pressing operation, timing that the press pressure detected by the pressure sensor exceeds a predetermined selection threshold value or timing that the press pressure becomes smaller than the selection threshold value as being attenuated after exceeding the selection threshold value.

As described above, according to the present invention, efficient and high-speed input operation can be performed with desirable press operation.

DETAILED DESCRIPTION OF THE EMBODIMENT(S)

Figure 1:
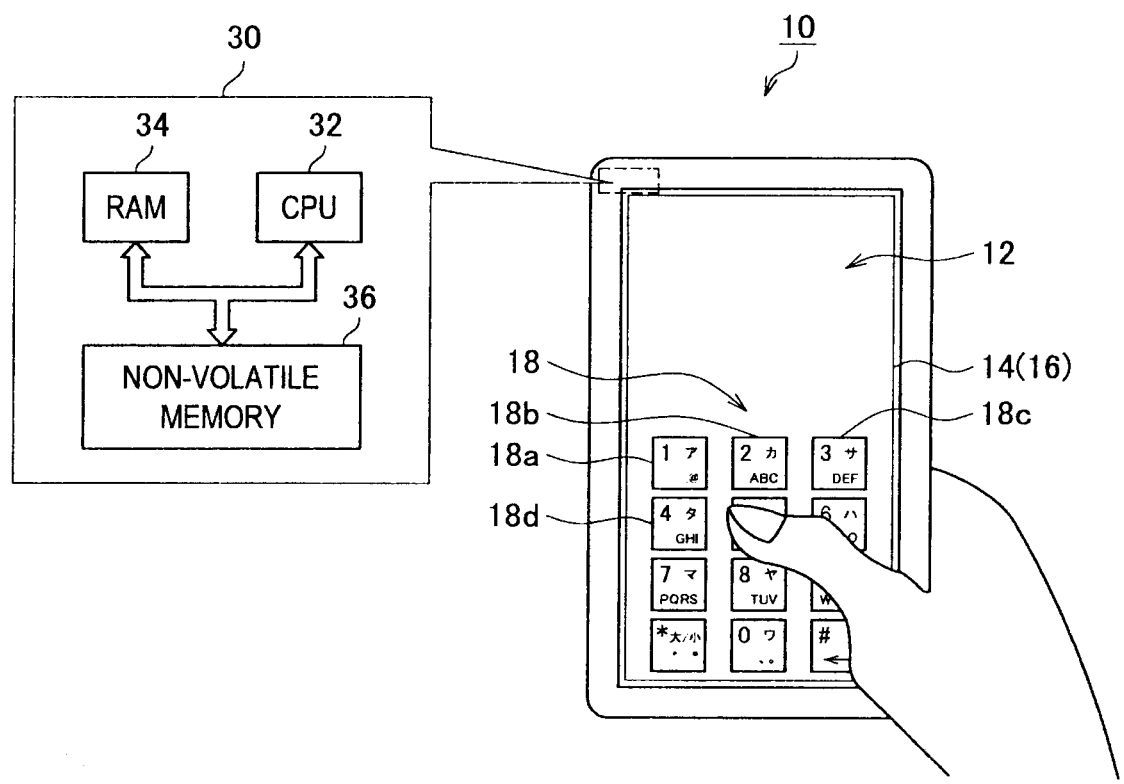
FIG. 1 is a view which illustrates a mobile device according to a first to third embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The embodiments of the present invention will be described in the following order.

First Embodiment

[1-1. Hardware Configuration of Mobile Apparatus]
[1-2, Functional Configuration of Mobile Device]
[1-3. Operation of Mobile Device]
  (Input Operation Process: Main Routine)
  (Selected Character Determination Process: Subroutine)
  (Variation of Selection State)
[1-4. Modified Example 1 of Selected Character Determination Process]
[1-5. Modified Example 2 of Selected Character Determination Process]

Second Embodiment

[2-1. Operation of Mobile Device]

Third Embodiment

[3-1. Operation of Mobile Device]

First Embodiment

[1-1. Hardware Configuration of Mobile Apparatus]

First, an overview of the hardware configuration of a mobile apparatus according to the first embodiment of the present invention will be described with reference to FIGS. 1 and 2.

As illustrated in FIG. 1, a mobile device 10 according to the present embodiment includes a display 12. For example, a liquid crystal display (LCD), an organic electroluminescence display (OELD) and the like may be utilized as the display 12.

The mobile device 10 according to the present embodiment is an example of an input apparatus to input information by contacting and pressing to the display 12. The mobile device 10 may be a portable terminal such as a cellular phone, a portable music player and a personal digital assistant (PDA). Further, the mobile device 10 may be an information processing device such as a note type personal computer (PC) and a desktop type PC.

In the following, the mobile device 10 to directly operate a display screen is described as an example of the input apparatus. The input apparatus can be used for input operation of an apparatus of which display screen is not directly operated, that is, an apparatus to which a touch panel to detect a position is not necessarily mounted, such as a touch-pad equipped note type PC and a touch-pad remote control for a television, a car navigation system or the like.

Virtual keys 18a, 18b, 18c, ... of the plural selection type having one or more input candidates selectively allocated are displayed on the display 12. In the following description of the present embodiment, software virtual keys to input a kana character or an alphabetical character by pressing a single key for plural times are exemplified. Here, a software keyboard of QWERTY key arrangement may be adopted as well.

Figure 2:
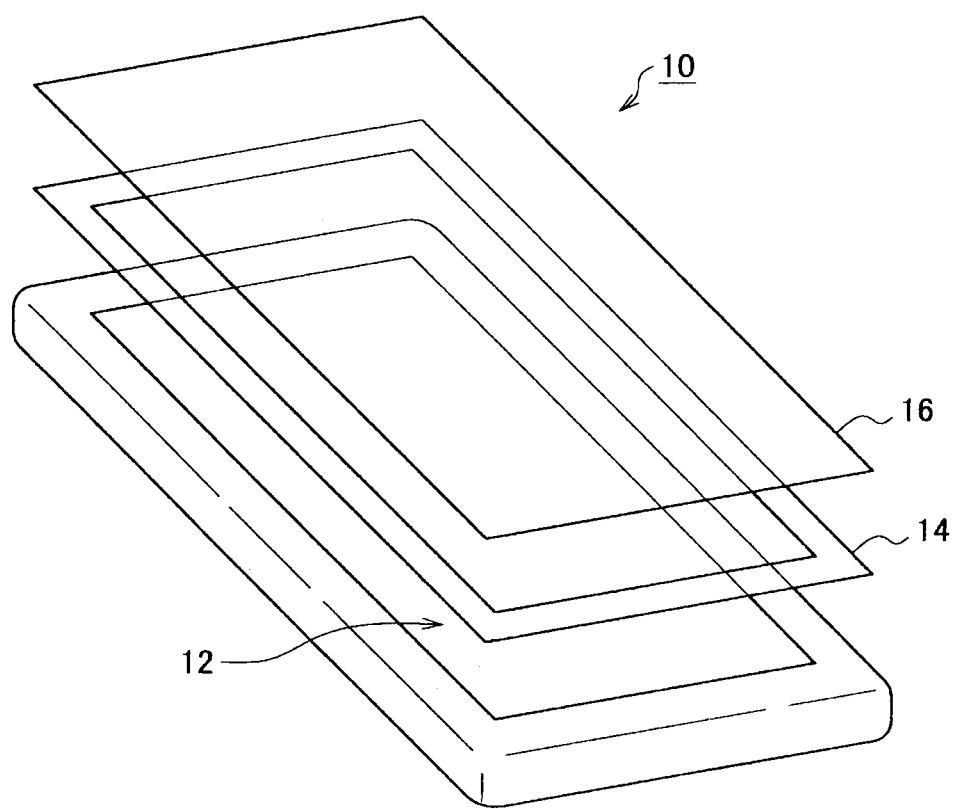
FIG. 2 is a view which illustrates a touch panel and a pressure-sensitive sensor mounted on the mobile device according to the first to third embodiment.

As illustrated in an exploded view of FIG. 2, in the mobile device 10 according to the present embodiment, a pressure-sensitive sensor 14 and a touch panel 16 both being sheet-shaped are laminated on the display screen side of the display 12. The pressure-sensitive sensor 14 has a configuration that pressure-sensitive conductive rubber is sandwiched by two sheet panels forming electrode planes. When the pressure-sensitive conductive rubber is deformed due to pressing of an operational body such as a finger to the display screen, the pressure-sensitive sensor 14 detects press pressure by detecting current-carrying at the deformed part. Considering display permeability, the pressure-sensitive sensor 14 is formed frame-shaped.

The touch panel 16 is arranged right above the pressure-sensitive sensor 14 disposed on the display screen. The touch panels 16 utilized in the present embodiment and later-mentioned embodiments may be an electrostatic type or an optical type as long as being a permeable type. The touch panel 16 according to the present embodiment has a lattice-shaped electrostatic sensor and detects a position (coordinates) of an operational body contacting to the display screen based on variation of electrostatic capacitance. When the touch panel 16 does not detect variation of the electrostatic capacitance, it is judged that the display screen of the display 12 is not touched by an operational body. On the other hand, when the touch panel 16 detects variation of the electrostatic capacitance, it is judged that the display screen of the display 12 is touched by an operational body.

Actually, the operational body does not touch the display screen of the display 12 but the surface of the touch panel 16. In the following, such a case is described as "the operational body touches the display screen of the display 12".

The mobile device 10 incorporates a microprocessor 30 as illustrated in FIG. 1. The microprocessor 30 includes a CPU 32, a RAM 34 and a non-volatile memory 36. The press pressure detected by the pressure-sensitive sensor 14 and the contact position detected by the touch panel 16 are stored in the RAM 34 or the non-volatile memory 36 of the microprocessor 30. The CPU 32 performs relating various information input from the pressure-sensitive sensor 14 and the touch panel 16 with display matters displayed on the display 12 and analyzes movement of the operational body thereby. The CPU 32 performs input operation to the mobile device 10 based on the analyzed movement of the operational body.

[1-2. Functional Configuration of Mobile Device]

Figure 3:
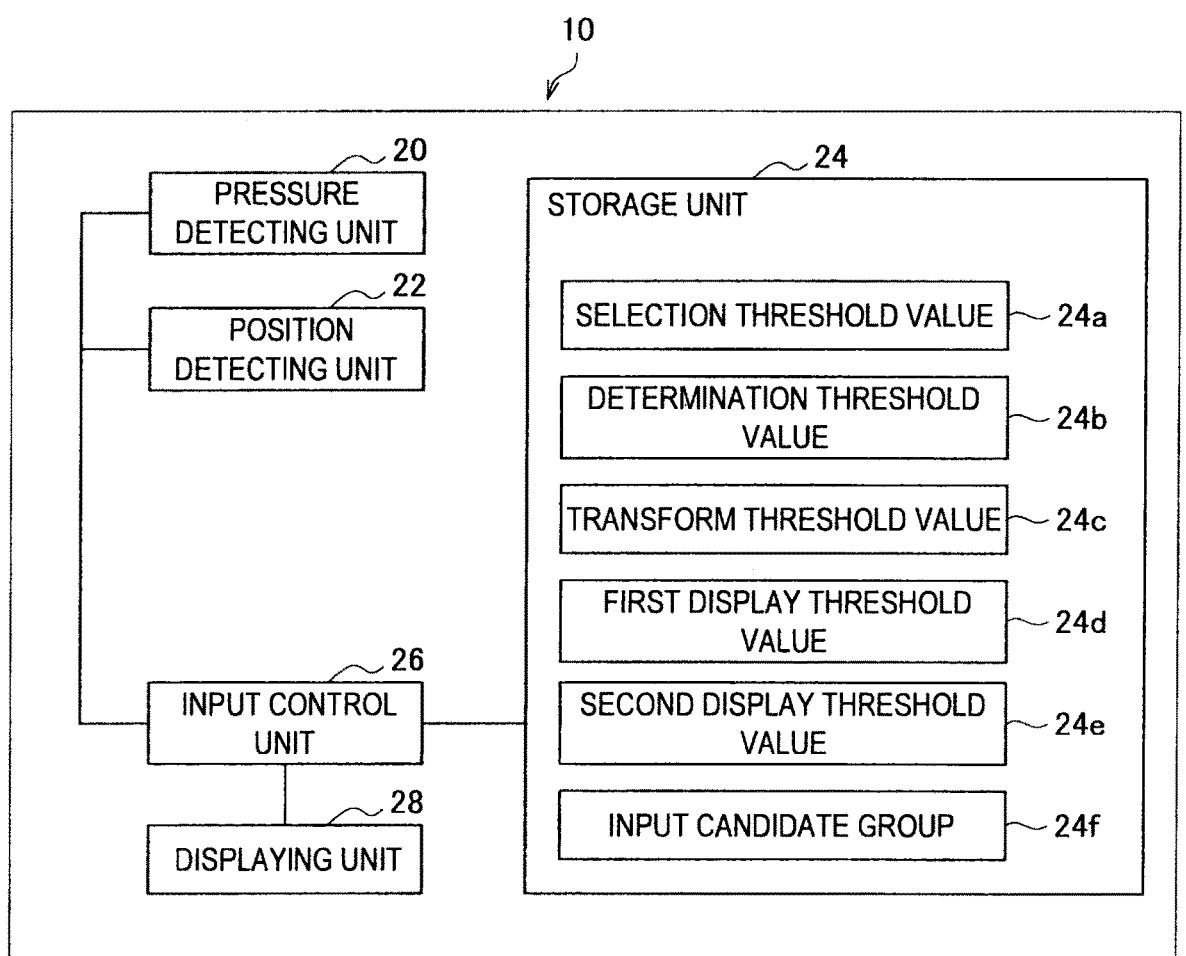
FIG. 3 is a view which illustrates a functional configuration of the mobile device according to the first to third embodiment.

The mobile device 10 according to the first embodiment has the functional configuration as illustrated in functional blocks of FIG. 3. That is, the mobile device 10 according to the present embodiment includes a pressure detecting unit 20, a position detecting unit 22, a storage unit 24, an input control unit 26 and a displaying unit 28.

The pressure detecting unit 20 is arranged at the display screen of the display 12 and detects the press pressure of an operational body (for example, a finger of an operator) applied on the display screen. The pressure-sensitive sensor 14 is an example of the pressure detecting unit 20.

The position detecting unit 22 is arranged at the display screen and detects the contact position of the operational body. The touch panel 16 is an example of the position detecting unit 22.

The storage unit 24 is constituted with the above RAM 34 and non-volatile memory 36, for example, and stores various threshold values. The various threshold values are utilized mainly against operation of the operational body for judging whether or not various processes which will be described later are performed. The storage unit 24 previously stores a selection threshold value 24a, a determination threshold value 24b, a transform threshold value 24c, a first display threshold value 24d and a second display threshold value 24e. The storage unit 24 temporally stores one or more input candidates (input candidate group 240 selected corresponding to operation of an operational body. Here, the first display threshold value 24d and the second display threshold value 24e are examples of a display threshold value being a determination criterion whether or not the input candidates are to be displayed as a preview.

The input control unit 26 varies a selection state of one or more input candidates selectively allocated to a virtual key for every pressing operation having the timing that the press pressure detected by the pressure detecting unit 20 exceeds the selection threshold value 24a as a single time of pressing operation.

For example, in the case that pressing operation is performed on a virtual key 18b, a selection state of input candidates of "A", "B" and "C" selectively allocated to the virtual key 18b is varied in the order of "A", "B" and "C" at each timing when the press pressure exceeds the selection threshold value 24a.

Here, it is also possible that the input control unit 26 varies the selection state in the order of "A", "B" and "C" at each timing when the press pressure falls below the selection threshold value 24a as being attenuated after exceeding the selection threshold value 24a.

When it is judged that determination operation by an operational body is performed based on the detected press pressure, the input control unit 26 determines selection of the input candidate which is in the selection state at that time. In the present embodiment, the timing to judge that determination operation by an operational body is performed is the timing when the press pressure by the operational body is judged not to be detected.

The input control unit 26 repeats determining selection of an input candidate which is in a selection state at timing thereof every time when it is judged that the determination operation by the operational body is performed. The one or more input candidates sequentially selection-determined as described above are stored in the input candidate group of the storage unit 24 in the order of being selection-determined. For example, when the input candidates of "A", "R" and "M" are sequentially selection-determined, a character string of "ARM" is stored in the input candidate group of the storage unit 24.

When the detected press pressure is judged being equal to or larger than the previously determined display threshold value, the displaying unit 28 displays the input candidate which is in the selection state at that time on the display 12. For example, in the mobile device 10 illustrated at the left side of FIG. 5, although a finger of an operator is put on a virtual key 18c of the touch panel 16, press pressure is not applied. In this case, the display 12 displays a preview of the selected character at a position where the preview is not to be hidden by the finger. Here, the selected character "e" is previewed. In this state, the input key operation is only in a selection state and the selection is not determined yet.

While pressing the virtual key with the finger as keeping contact thereto from this state, variation of the press pressure is detected by the pressure detecting unit 20. The selection state of the input candidate is varied corresponding to the detected variation of the press pressure and the displaying unit 28 varies the displaying state corresponding thereto. For example, the display unit 28 displays a preview of the input candidate in a size being proportional to magnitude of the detected press pressure.

Figure 5:
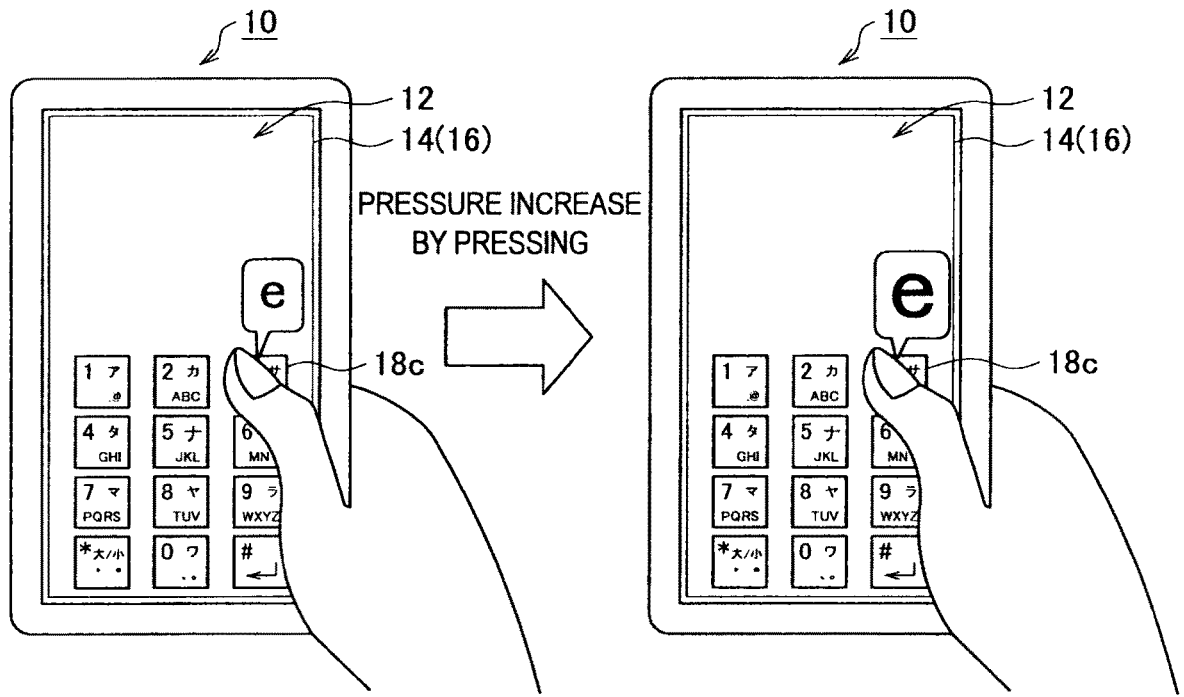
FIG. 5 illustrates an example of a display method of a selection state of an input candidate displayed at the mobile device according to the first embodiment.

As a specific example, when a pressure value P is equal to or smaller than the first display threshold value 24d, the preview of the selected key is displayed in a normal size as illustrated at the left side of FIG. 5. The displaying size at that time is denoted by "1". When the pressure value P becomes a value larger than the first display threshold value 24d and smaller than the second display threshold value 24c as being gradually increased, the preview of the selected key is displayed to be enlarged corresponding to the largeness of the value of applied pressure, as illustrated at the right side of FIG. 5. In this case, the displaying size is larger than that of the left side of FIG. 5. Accordingly, the operator can perceive what level of pressure is presently applied by oneself.

Figure 6:
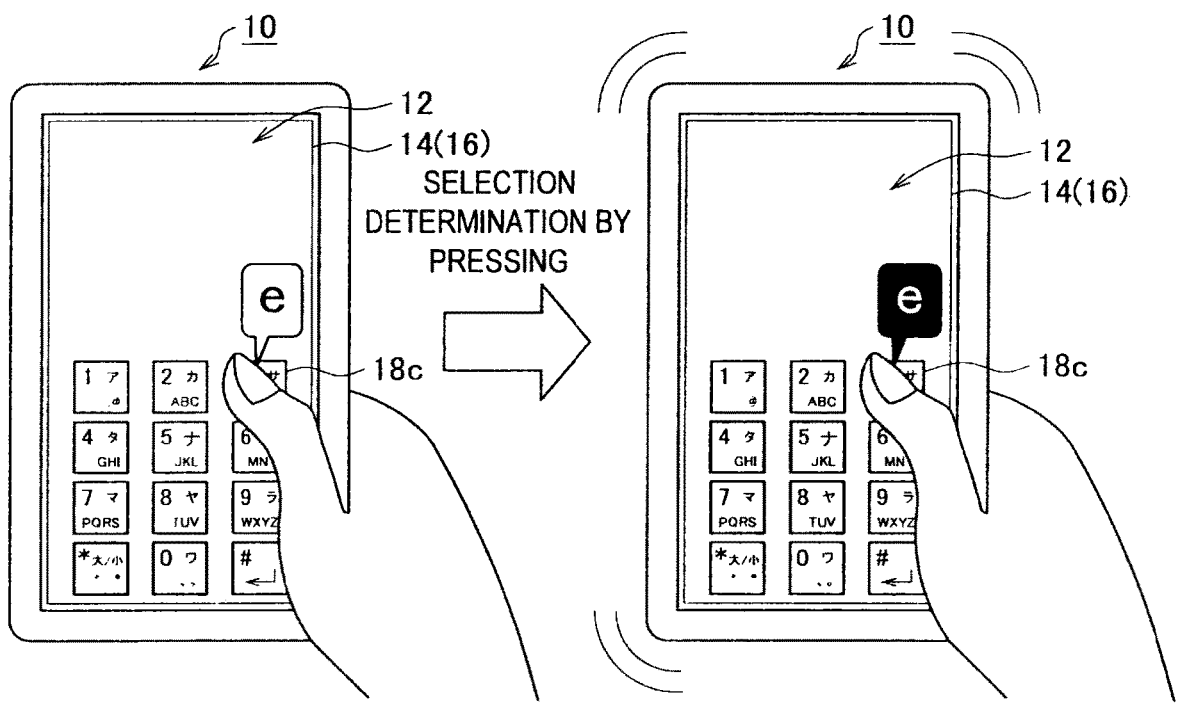
FIG. 6 illustrates an example of a display method of a selection state of an input candidate displayed at the mobile device according to the first embodiment.

When the pressure value P exceeds the selection threshold value as being further increased by further pressing the virtual key with the finger as keeping putting thereon, the input candidate is determined as selection and the selection-determined character is displayed reversed corresponding thereto, as illustrated at the right side of FIG. 6. In this manner, the selection determination of the input key operation is visually informed to the operator.

Here, other than exceeding of the absolute value of the pressure value P against the selection threshold value, it is also possible that the operation of "determination" is judged by exceeding of a temporal differentiation of pressure against a threshold value and the like. Further, in addition to applying the visual feedback by performing enlarged displaying and key selection displaying, on the display screen during operation as described above, it is also effective for actualizing intuitive operation to apply feedback with a vibration device such as a vibration motor.

Here, commands to each of the above units are executed by a dedicated control device or the CPU 32 for executing programs. The programs to perform an input operation process which will be described in the following are previously stored in the ROM 34 and the non-volatile memory 36. Then, the CPU 32 reads out the respective programs from the memories and performs execution, so that respective functions of the pressure detecting unit 20, the position detecting unit 22, the input control unit 26 and the displaying unit 28 are actualized.

[1-3. Operation of Mobile Device]

Figure 4:
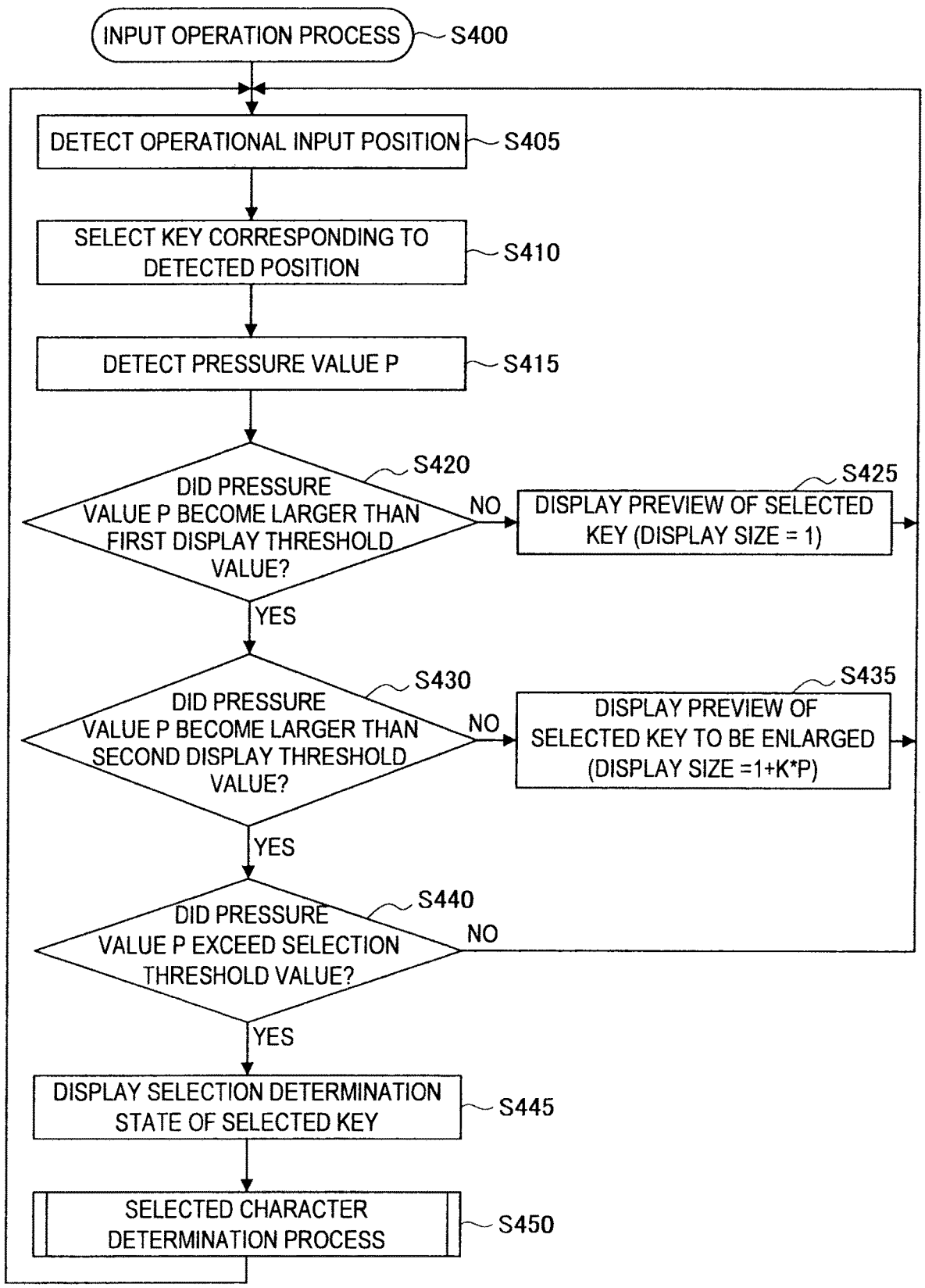
FIG. 4 is a flowchart which describes an input operation process (main routine) performed at the mobile device according to the first embodiment.

Next, the operation of the mobile device 10 according to the present embodiment will be described with reference to a flowchart illustrated in FIG. 4 as the input operation process.

(Input Operation Process: Main Routine)

When the input operation process is started from step S400, the position detecting unit 22 detects a position of operational input, that is, a position of the display screen where a finger being the operational body touches, in step S405. In step S410, the input control unit 26 selects a character corresponding to the detected position as an input candidate. For example, in the case of alphabetical input, the input control unit 26 selects a character "D" corresponding to the detected position when the finger touches the virtual key 18*c* of FIG. 1. In step S415, the pressure detecting unit 20 detects the pressure value P to press the virtual key 18*e*. In step S420, the input control unit 26 judges whether the pressure value P becomes larger than the first display threshold value 24*d*. When the pressure value P is equal to or smaller than the first threshold value 24*d*, the displaying unit 28 displays a preview of a character "D" selected at that time as proceeding to step S425 and returns to step S405.

Steps S405 to S420 are performed anew. When the input control unit 26 judges that the pressure value P becomes larger than the first display threshold value 24*d* in step S420, the input control unit 26 judges whether the pressure value P is larger than the second display threshold value 24*e* as proceeding to step S430. When the pressure value P is equal to or smaller than the second display threshold value 24*e*, the displaying unit 28 displays the preview of the character "D" selected at that time to be enlarged as proceeding to step S435 and it returns to step S405.

Figure 7:
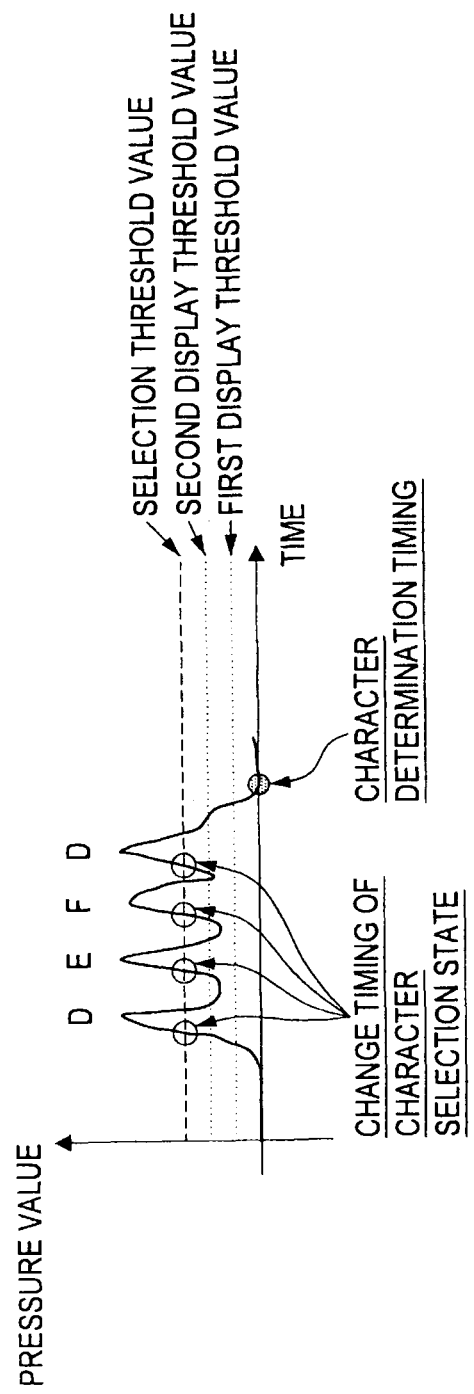
FIG. 7 is an explanatory view which illustrates variation of the selection state of the input candidate in input operation according to the first embodiment.

Returning to step S405 once again, steps S405 to S430 are performed. When the input control unit 26 judges that the pressure value P is larger than the second display threshold value 24*e* in step S430, the input control unit 26 judges whether the pressure value P exceeds the selection threshold value 24*a* as proceeding to step S440. As illustrated in FIG. 7, the processes are repeated as returning to step S405 until the pressure value P exceeds the selection threshold value 24*a*. Then, when the pressure value P exceeds the selection threshold value 24*a*, the selected character "D" is determined to be in a selection state and the displaying unit 28 displays that the selected character is in the selection state, as proceeding to step S445 (see the reversed character "e" at the right side of FIG. 6).

(Selected Character Determination Process: Subroutine)

Figure 8:
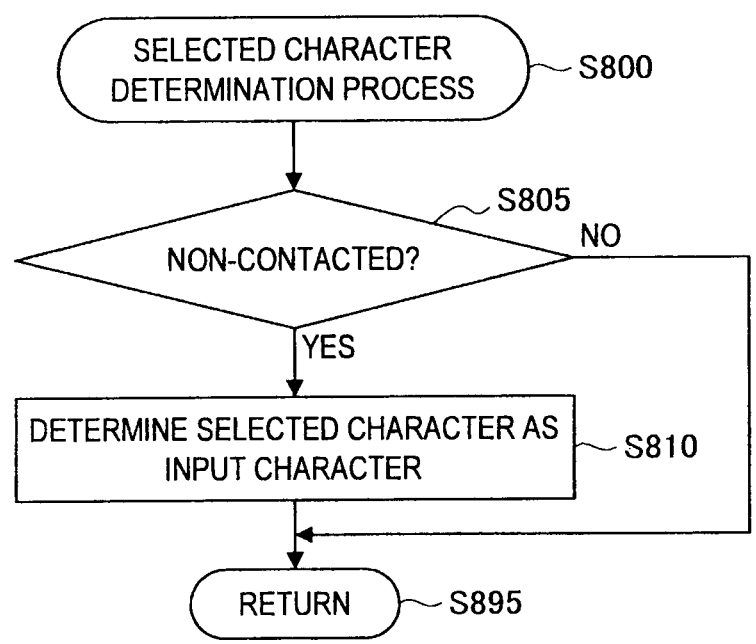
FIG. 8 is a flowchart which describes a selected character determination process (subroutine) performed at the mobile device according to the first embodiment.

In step S450, a selected character determination process is invoked. The selected character determination process starts from step S800 of FIG. 8. In step S805, the position detecting unit 22 judges whether the finger is contacted to the display screen. When the finger is contacted to the display screen, the process ends without performing selection determination of the character. On the other hand, when the finger is not contacted to the display screen, the input control unit 26 judges that determination operation by a finger is performed, and then, determines to select the input candidate "D" which is presently in the selection state, as proceeding to step S810. Thus, the selected character determination process of FIG. 8 is completed and it returns to the input operation process of FIG. 4.

(Variation of Selection State of Input Candidate)

Figure 9:
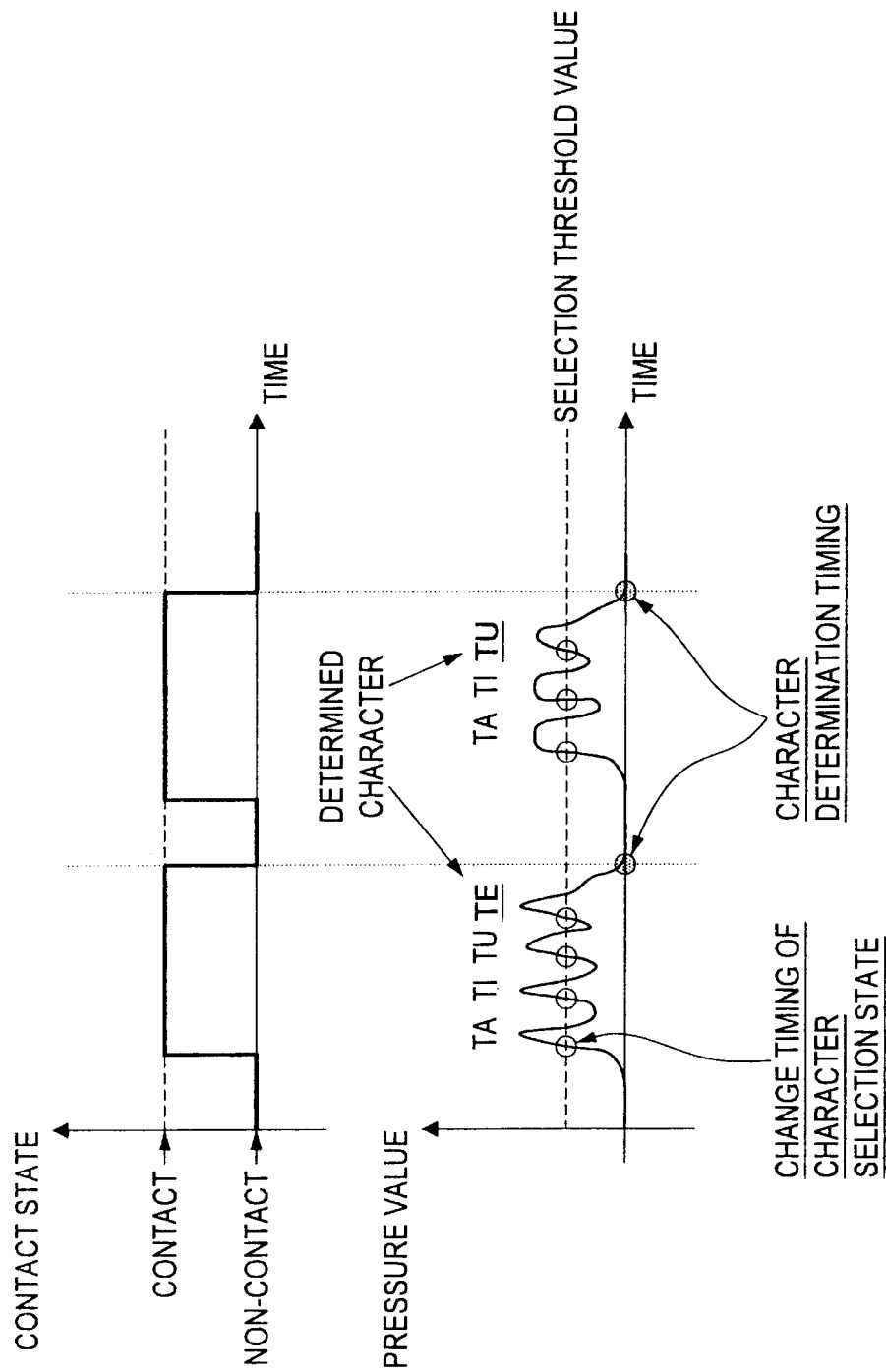
FIG. 9 is an explanatory view which illustrates determination of the input candidate in the input operation according to the first embodiment.

Next, selection state variation of input candidates will be further described with reference to the flowchart of FIG. 4 and a transition diagram of FIG. 9. Here, kana, input is adopted as an input mode. When an operator touches and presses a virtual key 18*d* of FIG. 1, an input candidate "TA" being in a selection state is selected as illustrated in FIG. 9 through steps S405 to S450 of the first time. At that time, the selection of the input candidate "TA" is not determined.

When the pressure value P exceeds the selection threshold value once again in steps S405 to S450 of the second time, the selection state of the input candidate varies from "TA" to "TI" as illustrated in FIG. 9. At that time, the finger maintains the contacted state. Here, the phenomenon that the pressure value P exceeds the selection threshold value once again requires assumption that the press pressure becomes smaller than the selection threshold as being attenuated after exceeding the selection threshold value. In this manner, a single time of pressing operation is acknowledged to be performed at ever: timing that the press pressure exceeds the selection value and the selection state of the input candidates is varied.

When the above processes are repeated, the selection state of the input candidate is varied from "TI" to "TU" by the pressing operation of steps S405 to S450 of the third time. Then, the selection state of the input candidate is varied from "TU" to "TE" by the pressing operation of steps S405 to S450 of the fourth time. Since the finger is not uncontacted in steps S405 to S450 of the first to third times, the selected character is not determined as the input character. Then, the finger becomes uncontacted thereafter as illustrated at the upper part of FIG. 9. Accordingly, the character "TE" is selected and determined as the input candidate in step S450 of the fourth time.

When the operator touches and presses the virtual key 18*d* of FIG. 1 once again, the processes of steps S405 to S450 are repeated once again. The selection state of the input candidates is continuously varied in the order of "TA", "TI", "TU", "TE", "TO", "TA", . . . corresponding to the number of pressing operation times until the finger becomes uncontacted.

In the related art, for continuous pressing by tapping with a software keyboard, an operator has borne a heavy burden due to necessity of getting his/her finger separated every time from a display screen. However, as described above, with the input method according to the present embodiment, character input can be performed while keeping an operator's finger contacted to a key even in character input with a virtual key of a software keyboard having similar feeling to a hardware keyboard. Accordingly, the input operation burden for the operator can be lightened to the similar extent to a hardware keyboard and input operation can be performed rapidly.

For example, when operating a software keyboard of the plural selection type, there have frequently occurred situations that characters allocated to the same virtual key are continuously input such as a situation to input "NA" and "NA" or "TE" and "TU" in Japanese inputting with a numerical keypad. In such inputting of the related art, it has been required to perform determination operation as once moving a finger to a determination key, a direction key or the like after inputting the first character, and then, to input the second character after moving the finger to the key position.

Meanwhile, with the input method according to the present embodiment, when a finger becomes uncontacted once being, apart from the touch panel 16, the character of input candidate of the plural selection type varied in a selection state at that time is determined as an input character, as illustrated in FIG. 9. Thus, the operator can determine selection of the first character only by operation of the finger separating from the touch panel 16. Accordingly, in the case of continuously inputting characters allocated to the same key by utilizing a software keyboard of the plural selection type, efficiency and speed of the input operation can be enhanced by eliminating excessive movement of a finger.

Here, in the case of continuously inputting characters allocated to different buttons being different from the above, the first character is determined at the time when the finger moves outside the first button range.

[1-4. Modified Example 1 of Selected Character Determination Process]

In the selected character determination process (see FIG. 8) described in the first embodiment, it is also possible that a character being in a selection state at the time when the pressure value P becomes smaller than the previously determined determination threshold value in the vicinity range of zero hut not being zero is selection-determined as an input candidate. In this case, the timing of judging that determination operation is performed by the operational body is when the press pressure is judged being equal to or smaller than the determination threshold value 24$b$.

Figure 10:
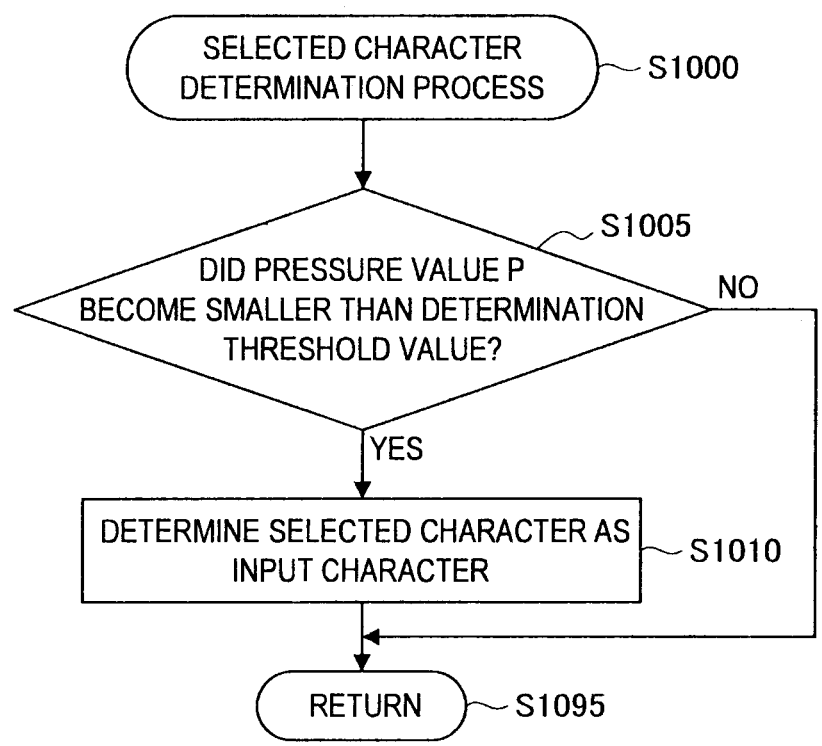
FIG. 10 is a flowchart which describes a selected character determination process (subroutine) performed at the mobile device according to modified example 1 of the first embodiment.

The selected character determination process of modified example 1 will be briefly described with reference to FIGS. 10 and 11. In the first embodiment, when judged being non-contacted in step S805 of FIG. 8, the selected character is determined as the input candidate in step S810. Meanwhile, in modified example when the pressure value P is judged being smaller than the determination threshold value 24$b$ in step S1005, the selected character is determined as the input candidate in step S1010.

Figure 11:
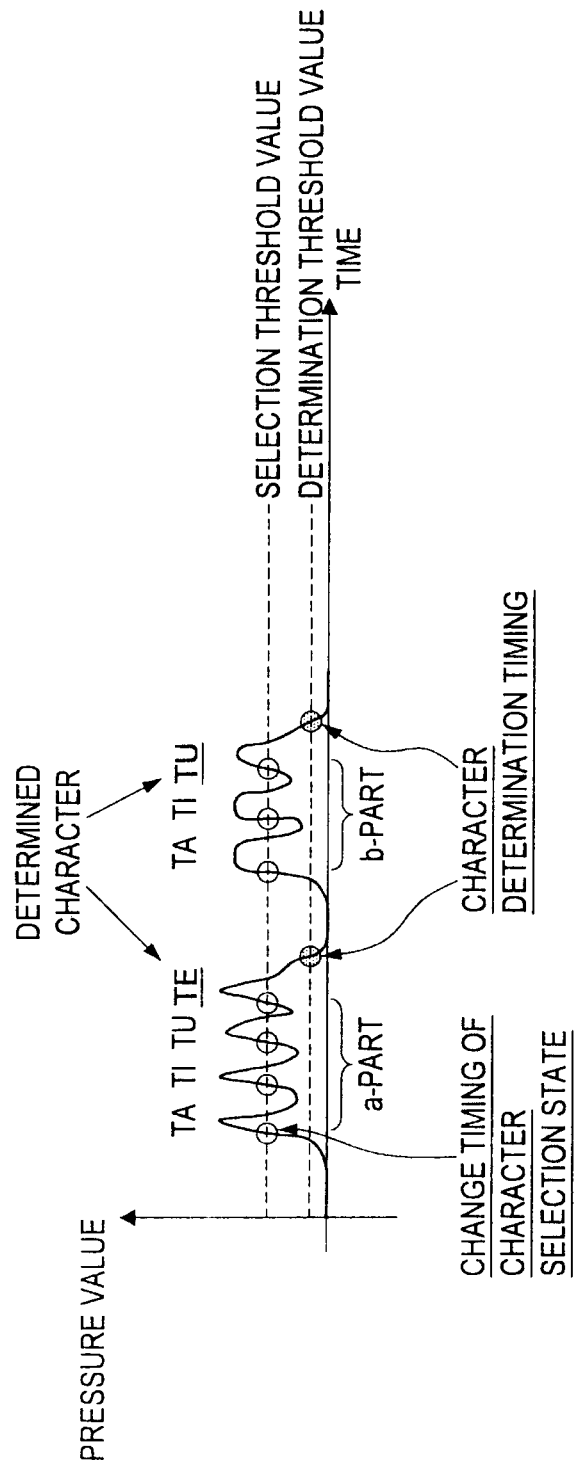
FIG. 11 is an explanatory view which illustrates determination of the input candidate in the input operation according to modified example 1 of the first embodiment.

The selected character determination method according to modified example 1 is based on consideration of tendency that the pressure value P does not drop to the vicinity of zero during an operator continuously presses a button (apart in FIG. 11). With the operation determination method according to modified example 1, an operator can perform character inputting continuously without his/her finger separating from a key.

[1-5. Modified Example 2 of Selected Character Determination Process]

Figure 13:
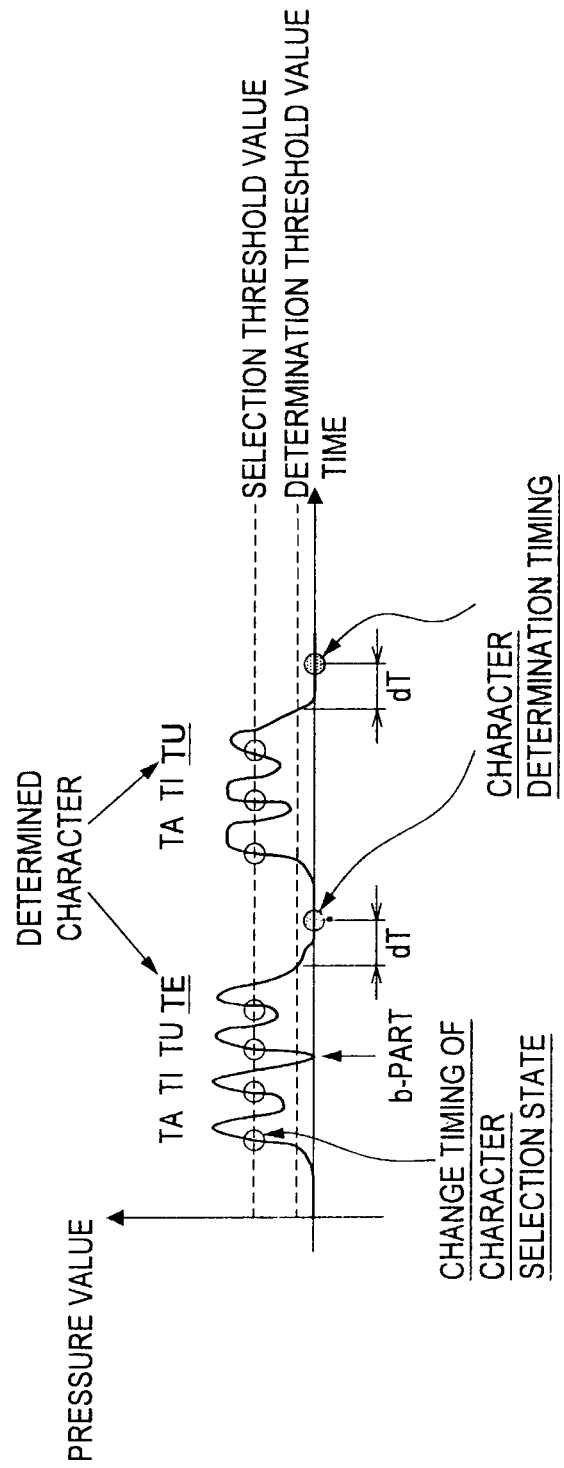
FIG. 13 is an explanatory view which illustrates determination of the input candidate in the input operation according to modified example 2 of the first embodiment.

Further, it is also possible that a selected character may be determined as an input candidate after time dT passes from when the pressure value P becomes equal to or smaller than a previously determined determination threshold value in the vicinity zone of zero (see FIG. 13). In this case, the timing of judging that determination operation is performed by the operational body is when a predetermined time passes after the press pressure is judged being equal to or smaller than the determination threshold value 24$b$.

Figure 12:
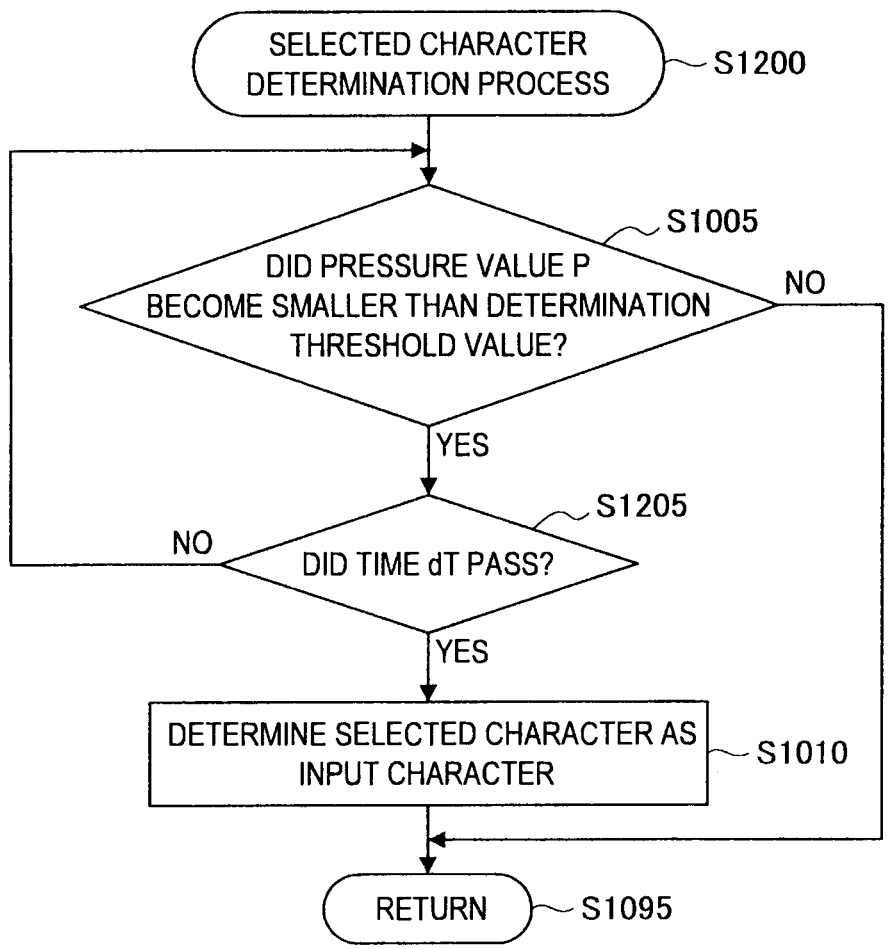
FIG. 12 is a flowchart which describes a selected character determination ti process (subroutine) performed at the mobile device according to modified example 2 of the first embodiment.

The selected character determination process of modified example 2 will be briefly described with reference to FIGS. 12 and 13. In modified example 2, when it is judged that time dT passes in step S1205 after the pressure value P is judged being smaller than the determination threshold value in step S1005 in FIG. 10, the selected character is determined as the input candidate in step S1010.

With the selected character determination method according to modified example 2, even when the pressure value P drops to equal to or smaller than the determination threshold value by mistake during an operator continuously pressing a button (b-part in FIG. 13), it is possible to prevent that selection determination of the input candidate is performed by mistake.

Second Embodiment

Next, the mobile device 10 according to the second embodiment of the present invention will be described with reference to FIGS. 14 and 15. As described above, with a hardware keyboard or a software keyboard, it is sometimes required to change a state of a selected character such as transforming from "KA" to "GA" and from "a" to "A", for example. In the related art, such a case has desired complicated input operation such as performing transform and the like by pressing the "dull/half-dull sound transform key" or the "case-shift key" arranged separately from character keys. Accordingly, such operation has caused decrease in inputting efficiency.

Figure 15:
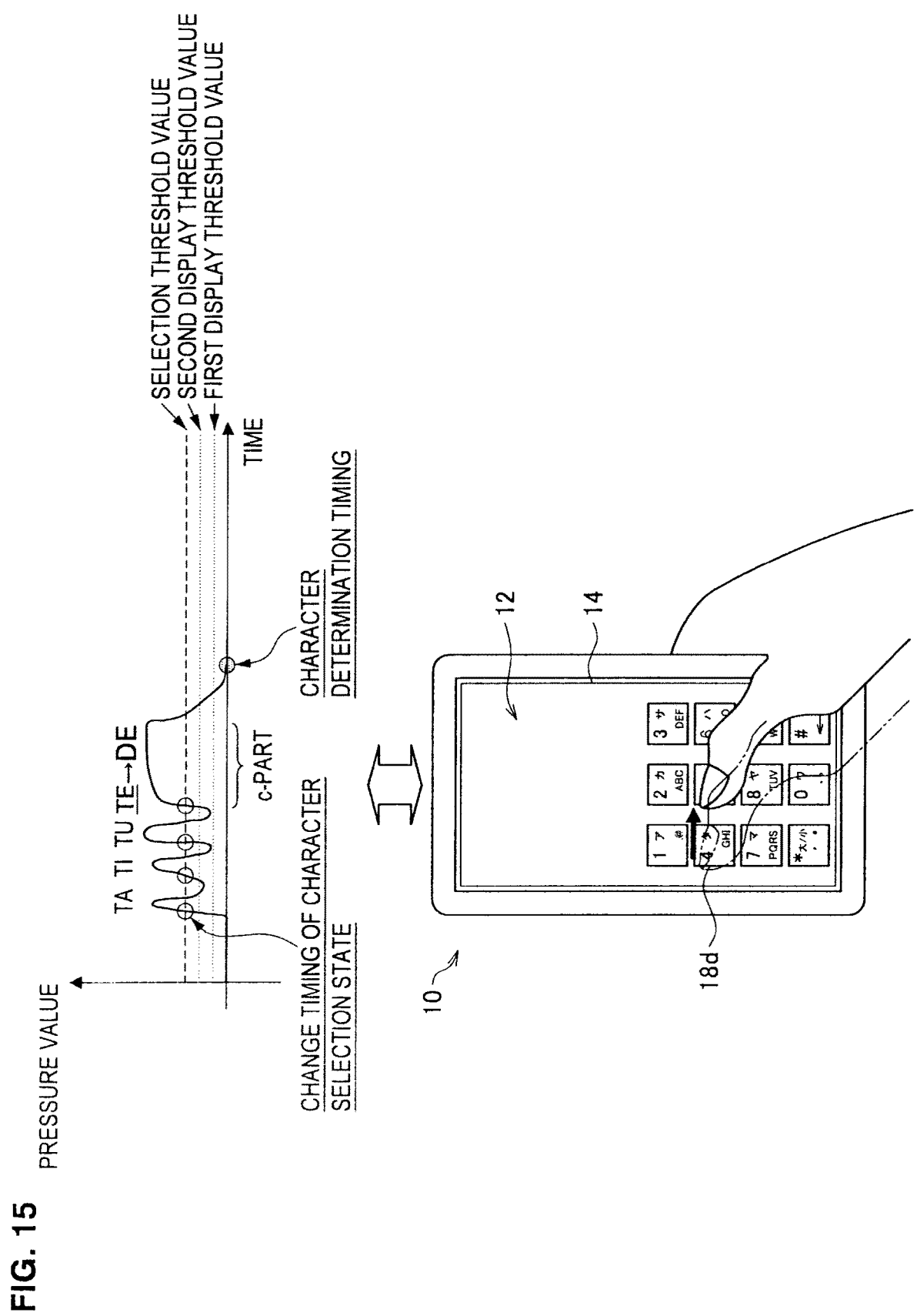
FIG. 15 is an explanatory view which illustrates variation of the selection state of the input candidate in input operation according to the second embodiment.

Meanwhile, with the mobile device 10 according to the second embodiment of the present invention, transforming of selection state between characters being associated from one another like the "dull/half-dull sound transform key" and the "case-shift key" can be efficiently performed by combining pressing operation and sliding operation of a finger, as illustrated in FIG. 15. In view of the above, when a contact position detected by the position detecting unit 22 is judged being out of the operational area of the virtual key while maintaining the press pressure detected by the pressure detecting unit 20 equal to or larger than the selection threshold value, the input control unit 26 according to the present embodiment varies the selection state to another input candidate relating to the input candidate which is in the selection state at that time corresponding to the direction of contact position variation. In the following, operation of the mobile device 10 according to the second embodiment will be described.

[2-1. Operation of Mobile Device]

Figure 14:
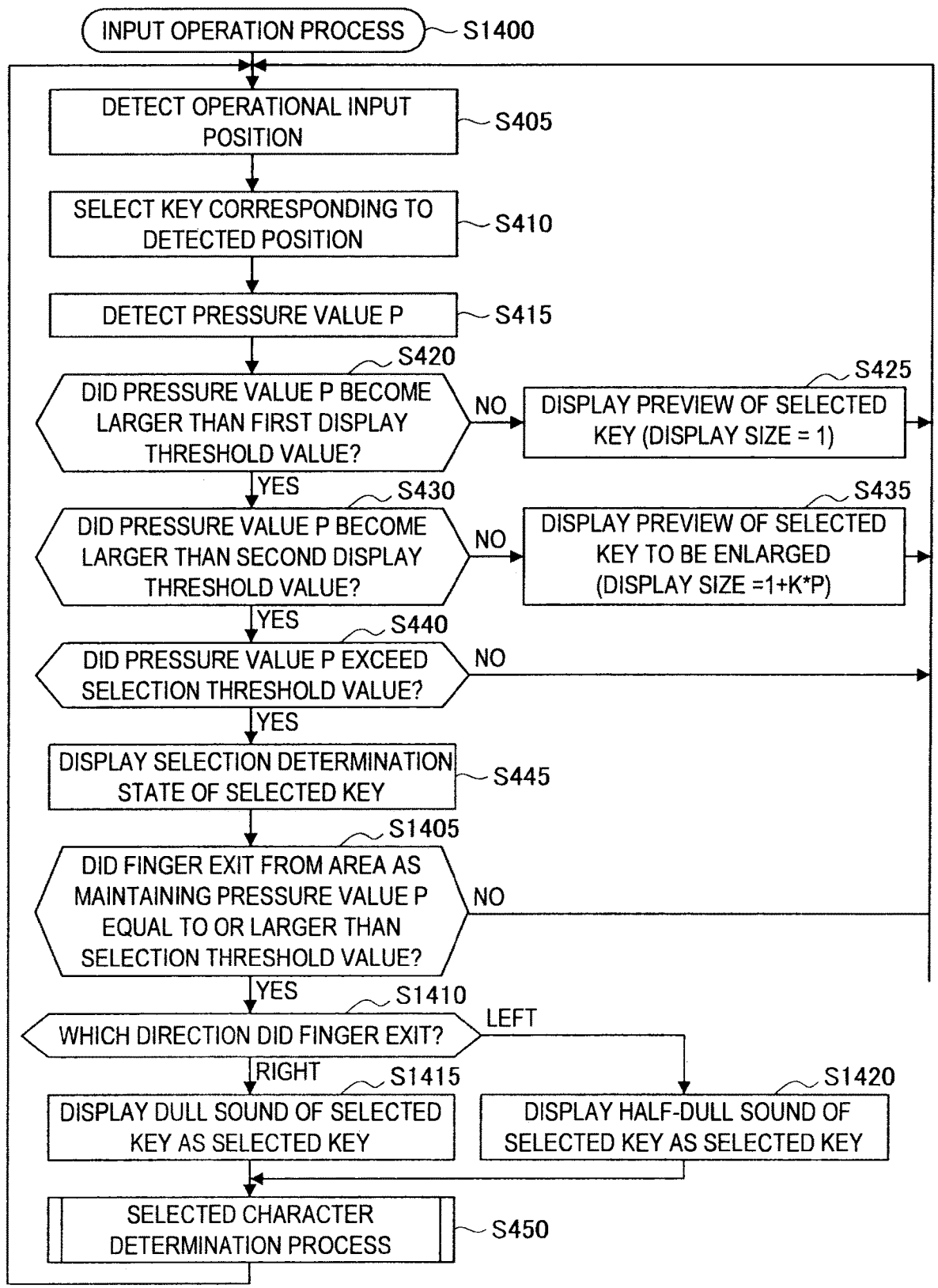
FIG. 14 is a flowchart which describes an input operation process (main routine) performed at the mobile device according to the second embodiment of the present invention.

When the input operation process is started from step S1400 of FIG. 14, the position detecting unit 22 detects a position of the display screen where a finger touches, in step S405. In step S410, the input control unit 26 selects a character corresponding to the detected position as an input candidate. For example, in the case of kana input, the input control unit 26 selects a character "TA" corresponding to the detected position when the finger touches the virtual key 18$d$ of FIG. 1. In step S415, the pressure detecting unit 20 detects the pressure value P to press the virtual key 18$d$. The preview of the selected character is controlled through the processes of steps S420 to S435. Since the processes of steps S420 to S435 are similar to those of the first embodiment, detailed description will not be repeated.

Here, it is assumed that the selection state of characters varies in the order of "TA", "TI", "TU", and "TE" as illustrated in FIG. 15 by repeating steps S405 to S445 and step S1405. In step S1405, the input control unit 26 judges whether the contact position detected by the position detecting unit 22 falls outside the operational area of the virtual key in the state that the press pressure detected by the pressure detecting unit 20 is maintained equal to or larger than the selection threshold value. In FIG. 15 it is judged being "NO" and returns to step S405 until a character "IF" becomes in the selection state.

When the character "TE" becomes in the selection state, the input control unit 26 judges that the contact position detected by the position detecting unit 22 falls outside the operational area of the virtual key in the state that the press pressure detected by the pressure detecting unit 20 is maintained equal to or larger than the selection threshold value. For example, in the mobile device 10 illustrated at the lower part of FIG. 15, the finger moves to slide rightward from the virtual key 18*d* and the contact position of the finger falls outside the virtual key 18*d*.

In this case, proceeding to step S1410, the input control unit 26 judges which direction the finger falls based on the movement direction of the contact position. When the finger falls outside in the right direction, proceeding to step S1415, the input control unit 26 varies the selected character to "DE" to be dull sound from the character "TE" being in the selection state at that time (c-part in the transition diagram at the upper side of FIG. 15), and then, performs the selected character determination process of step S450.

Meanwhile, when the finger falls outside in the left direction, proceeding to step S1420 from step S1410, the input control unit 26 varies the selected character to be half-dull sound from the character "TE" being in the selection state at that time. Here, since there is no half-dull sound of "TE", the selected character remains as "TE".

As described above, with the mobile device 10 according to the present embodiment, when performing input to vary the selection state corresponding to the number of pressing, the character selection state can be varied from the present character to another input candidate relating thereto such as transforming from "KA" to "GA" and from "a" to "A" by moving the finger position in the vertical direction or the horizontal direction in the state of maintaining the finger as pressing. Thus, the finger movement amount can be reduced and the input operation burden for the operator can be lightened at the time of input operation. Accordingly, efficient and rapid input operation can be actualized.

As another example of variation from the present character to another input candidate relating to the character, a method to define operation corresponding to the finger movement direction may be considered. In this method, in the state of maintaining the finger as pressing to input a character "HA", the character will be "BA" when the finger is moved rightward, the character will be "PA" when moved leftward, and the input character will be cancelled when moved upward, for example. Further, it is also possible to transform to another character relating to the character presently being in the selection state such as a case shift.

Third Embodiment

Finally, the mobile device 10 according to the third embodiment of the present invention will be described with reference to FIGS. 16 and 17. In the related art, it has been well known a method to enhance efficiency of inputting by providing predictive transform candidates against character input with a keyboard and selecting any of the predictive transform candidates. However, in most cases, the predictive transform candidates are displayed at a position being apart from the keyboard to prevent overlap therewith. Therefore, a finger is required to be moved outside the keyboard area to select a predictive transform candidate, so that the enhancing speed of input operation is disturbed. There are cases that a predictive transform candidate button is arranged within a keyboard. However, since the finger movement is required being similar to the above, efficiency is inadequate in most cases.

Figure 17:
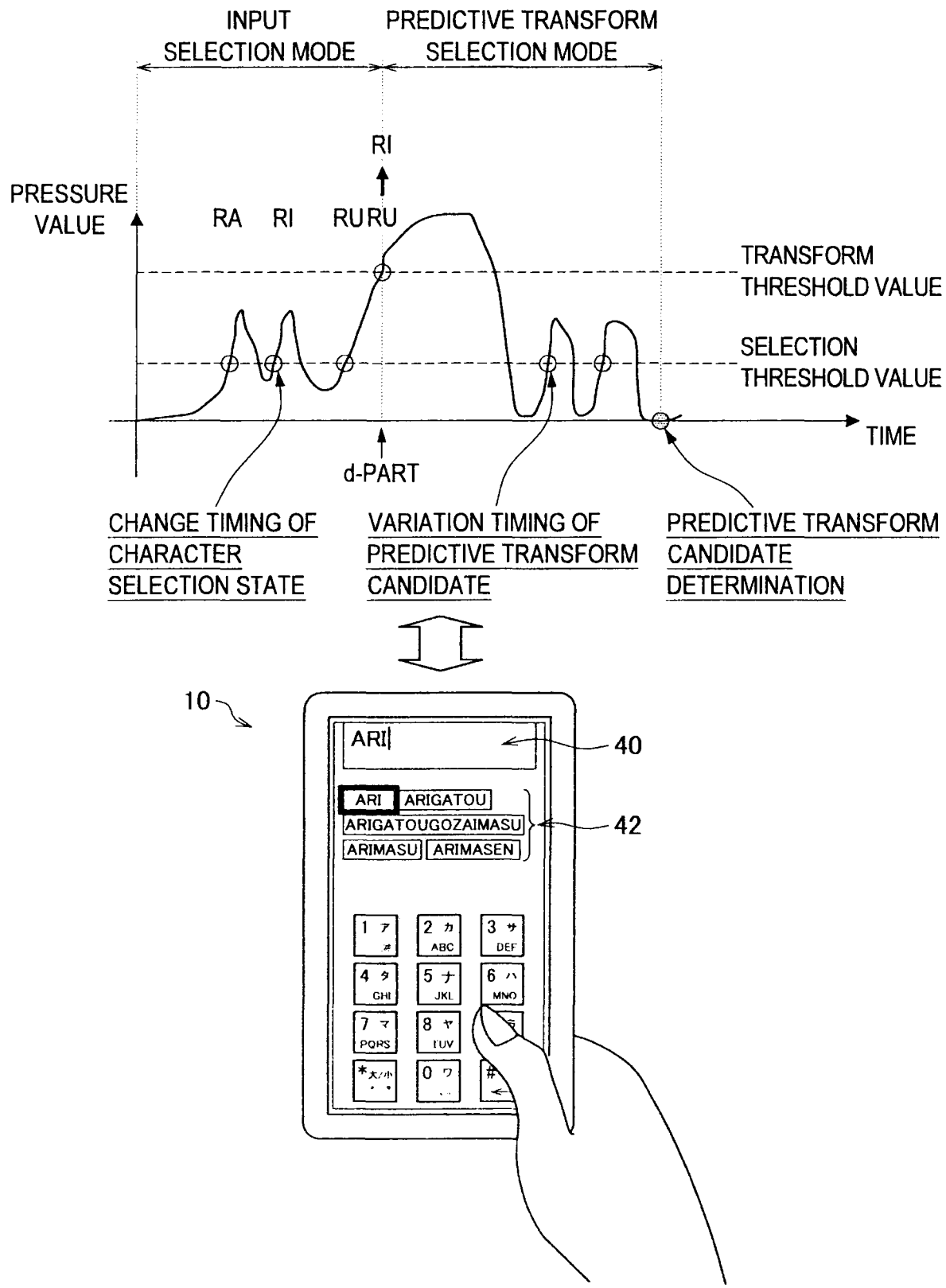
FIG. 17 is an explanatory view which illustrates variation of the selection state of the input candidate in input operation according to the third embodiment.

Meanwhile, with the input operation according to the present embodiment, a judging threshold value (transform threshold value) for predictive transform candidate selection is arranged in addition to the judging threshold value (selection threshold value) for variation of character selection state, as illustrated in FIG. 17. When the pressure value P exceeds the transform threshold value, the next previous variation is cancelled and selecting of a predictive transform candidate is to be performed. At that time, when the detected press pressure is judged being equal to or larger than the transform threshold value, the input control unit 26 switches to a predictive transform selection mode from an input selection mode. The input selection mode is the mode to select an input candidate group as described above. The predictive transform selection mode is the mode to provide, to an operator, a character string relating to the selected input candidate group as a transform candidate.

The input control unit 26 varies the selection state of the predictive transform candidates for every pressing operation in the predictive transform selection mode. Further, when the determination operation by the operational body is judged being performed based on the detected press pressure in the predictive transform selection mode, the input control unit 26 determines to input the predictive transform candidate which is in the selection state at that time. Accordingly, input operation can be simplified while the finger movement amount can be reduced. In the following, the operation of the mobile device 10 according to the third embodiment will be described.

[3-1. Operation of Mobile Device]

Figure 16:
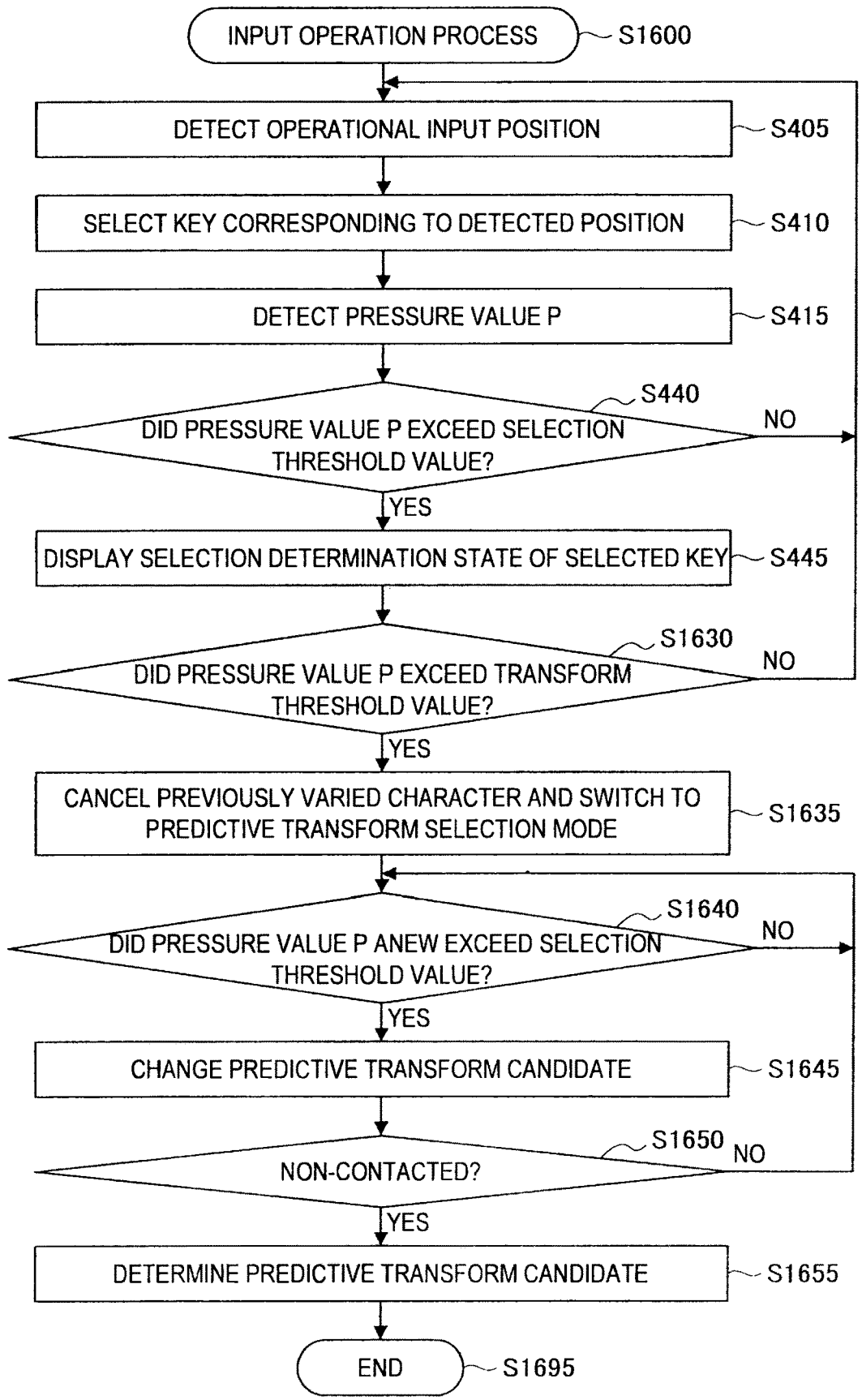
FIG. 16 is a flowchart which describes an input operation process (main routine) performed at the mobile device according to the third embodiment of the present invention.

When the input operation process is started from step S1600 of FIG. 16, variation of selection state of an input character and selection determination of the input character are performed by performing steps S405 to S415, S440 and S445, being similar to the first embodiment. Here, it is assumed that a character "A" is firstly selection-determined with the process, and then, a character "RA" is in the selection state as a finger touches a virtual key of which top kana character is "RA" as illustrated in FIG. 17.

In this case, the input control unit 26 judges whether the pressure value P exceeds the transform threshold value in step S1630 following to step S445. As illustrated in FIG. 17, at the time when the character "RA" becomes in the selection state, the pressure value P does not exceed the transform threshold value. Then, returning to step S405, the processes of steps S405 to S415, S440 and S445 are repeatedly performed. Consequently, it is assumed that the selection state of the input character varies in the order of "RA" "RI" and "RU".

Subsequently, step S1630 is performed at the timing of d-part of the upper part of FIG. 17 and the input control unit 26 judges that the pressure value P exceeds the transform threshold value. Proceeding to step S1635, the selected character is to be "RI" as cancelling the selected character "RU" which was next previously varied, and then, it proceeds to the selection mode of predictive transform candidates from the selection mode of the input characters. That is, a predictive transform candidate group against the input candidate group "ARI" constituted with previously selection-determined "A" and presently selection-determined "RI" is to be displayed. On the display illustrated at the lower part of FIG. 17, "ARI" is displayed at the displaying area for the input candidate group and a plurality of predictive transform candidates against the character string "ARI" of the input candidate are proposed at the displaying area of the predictive transform candidates.

In step S1640, the input control unit 26 judges whether the pressure value P exceeds the selection threshold value once again. When the pressure value P is judged exceeding the selection threshold value once again, the input control unit 26 varies the predictive transform candidates in step S1645. At that time, since a selection cursor is displayed in the predictive transform candidate area, feedback of the variation of the selection state of the predictive transform candidates can be provided to the operator. In this manner, the selection cursor moves on the predictive transform candidates corresponding to the number of pressing.

In step S1650, the finger is determined whether being contacted utilizing the position detecting unit 22. Steps S1640 to S1650 are repeatedly performed until the finger gets uncontacted, so that the selection state of the predictive transform candidates is varied. When the finger gets uncontacted, proceeding to step S1655, the input control unit 26 determines the predictive transform candidate varied in the selection state at that time as the input character (see the transition diagram at the upper part of FIG. 17). Then, the present process is completed.

With the above input operation, for example, a character string of "ARIGATOUGOZAIMASU" is input by an operator as follows. That is, after the character "RI" is input, the operator confirms that the character string of "ARIGATOUGOZAIMASU." is displayed at the third place of the predictive transform candidates at the upper part of the display screen. Then, by strongly pressing the virtual key of which top kava character is "RA" once again, it proceeds to the predictive transform selection mode.

As illustrated in FIG. 17, the character is varied to "RU" in midstream of proceeding to the predictive transform selection mode. However, at the time when pressure value P exceeds the transform threshold value, the next previous variation from "RI" to "RU" is cancelled and the predictive transform candidates against "ARI" are selected. Further, with two times of pressing input, the third predictive transform candidate of "ARIGATOUGOZAIMASU" is selected. Then, with the judging method described as the selected character determination process of FIG. 8, selection of the desired predictive transform candidate is determined. In this manner, the operator can select a predictive transform candidate with continuous pressing input operation without moving his/her finger out of the normal keyboard area.

According to the above respective embodiments and modified example, efficient and high-speed input operation can be actualized by pressing operation without placing a burden on the operator. Basically, since key input operation can be performed continuously as maintaining a finger, a pen or the like to contact to the display screen, typing errors can be suppressed.

Further, normally, when a software keyboard is operated with one-handed operation against the mobile device 10, non-contacting and contacting operation of a finger from and to the device is repeated as tapping operation. Accordingly, the holding state of the mobile device 10 becomes unstable and there may be a case that the mobile device 10 falls. Meanwhile, with the input operation according to the respective embodiments and modified examples, the key input can be performed in a state that the finger is continuously contacted to the display screen. Therefore, the holding state becomes stable and the risk of falling can be avoided thereby.

Further, with the input operation according to the respective embodiments and modified example, visual and tactual feedback corresponding to press pressure can be provided to the operator. Therefore, instinctive operation can be actualized being similar to the case of operating a hardware keyboard.

For example, in the first embodiment, the selection state is varied corresponding to the number of pressing, and then, input operation is performed to determine the selection state by releasing. The selection state is varied corresponding to the number of pressing, and then, input operation is performed to determine the selection state by decrease in press pressure. The selection state is varied corresponding to the number of pressing, and then, input operation is performed to determine the selection state by decrease in press pressure and time elapsing. Accordingly, the operator is capable of efficiently performing to input by continuous pressing against the plural selection type keyboard. Specifically, in a situation that characters allocated to the same virtual key are continuously input, it is not required to move a finger for determination of the first character as the case of a normal hardware keyboard or the case of inputting with a software keyboard by tapping. Therefore, efficiency of operation can be enhanced.

In the second embodiment, the selection state of characters is varied corresponding to the number of pressing and input operation is performed to vary the selection state of characters such as dull/half-dull sound and case shift corresponding to a movement direction of position movement during the pressed state.

Accordingly, in the operation to perform character transforming such as transforming to dull sound or half-dull sound of characters and transforming of case shift, the finger movement amount can be suppressed and inputting can be efficiently performed.

On the third embodiment, input operation is performed so that the character selection state is varied when press pressure exceeds the first threshold value (selection threshold value) and a predictive transform candidate is selected when press pressure exceeds the second threshold value (transform threshold value). Accordingly, in selecting a predictive transform candidate, the finger movement amount can be suppressed and inputting can be efficiently performed.

In this manner, in each embodiment, efficient keyboard operation can be actualized for input operation utilizing a device having the position detecting unit to detect a contact position with a touch panel and the like and the pressure detecting unit to detect pressing degree as the pressure value with a pressure-sensitive sensor and the like. Accordingly, the burden for an operator can be lightened and rapid input operation can be actualized.

In the above first to third embodiments and modified examples thereof, operations of each unit are related from one another. Therefore, considering the mutual relation, the operations can be replaced with a series of operations and a series of processes. Accordingly, the embodiment of an input apparatus such as a mobile device can be an embodiment of an input method and an embodiment of a program to cause a computer to execute functions of the input apparatus.

Accordingly, it is possible to provide a method including the steps of detecting press pressure of an operational body applied to a virtual key to which one or more input candidates are selectively allocated with a pressure sensor and varying the selection state of the one or more input candidates selectively allocated to the virtual key for every pressing operation having, as a single time of pressing operation, the timing that press pressure detected by the pressure sensor exceeds the selection threshold value or the timing that the press pressure becomes smaller than the selection threshold value as being attenuated after exceeding the selection threshold value.

Accordingly, it is possible to provide a program causing a computer to execute a process to detect press pressure of an operational body applied to a virtual key to which one or more input candidates are selectively allocated with a pressure sensor and a process to vary the selection state of the one or more input candidates selectively allocated to the virtual key for every pressing operation having, as a single time of pressing operation, the timing that press pressure detected by the pressure sensor exceeds the selection threshold value or the timing that the press pressure becomes smaller than the selection threshold value as being attenuated after exceeding the selection threshold value.

It should be understood by those skilled in the art that various modifications, combinations, sub-combinations and alterations may occur depending on design requirements and other factors insofar as they are within the scope of the appended claims or the equivalents thereof.

For example, in the above embodiments, the pressure detecting unit 20 is arranged on the display screen of the display 12 and detects press pressure of an operational body applied to the display screen. The pressure-sensitive sensor 14 is described as an example of the pressure detecting unit 20. However, it is also possible for the pressure detecting unit according to the present invention to judge desired operation based on contact/non-contact to the touch panel but not on pressure. Accordingly, in the present invention, the timing of judging that determination operation is performed by the operational body may be the timing that the press pressure by the operational body is not to be detected or the timing that a non-contact state is detected at the touch panel.

Further, in the above embodiments, a software keyboard for inputting kana characters stepwise is described as an example. However, a software keyboard of QWERTY key arrangement may be utilized as well.

Further, in addition to characters such as katakana, hiragana, kanji and alphabetical characters, input operation of the present invention includes numerals, symbols and the like.

What is claimed is:

1. A device comprising:
    a display configured to display a plurality of objects;
    at least one sensor configured to detect a contact;
    a vibration device; and
    circuitry configured to
        detect a position and pressure of the contact,
        select one object of the plurality of objects based on the position of the contact,
        control the display to display an additional view related to the selected object in a first manner, if the pressure exceeds a first threshold, wherein the additional view is enlarged corresponding to an amount of the pressure in the first manner, and
        control the display to display the additional view in a second manner and control the vibration device to apply a haptic feedback, if the pressure exceeds a second threshold,
    wherein the vibration device does not apply the haptic feedback prior to the pressure exceeding the second threshold.

2. The device according to claim 1, wherein the circuitry is further configured to determine that a determination of the selected object is performed at any of a timing when the pressure is judged as not being detected, a timing when the pressure is judged as being equal to or less than a determination threshold value which is less than the first threshold, and a timing when a predetermined time elapses after the pressure is judged as being equal to or less than the determination threshold value.

3. The device according to claim 1, wherein the circuitry is further configured to control the display to vary a displaying state of the selected object, in correspondence with variation of the detected pressure of the contact.

4. The device according to claim 1, wherein the device is a portable device.

5. The device according to claim 1, wherein the device is a cellular phone, a portable music player, a personal digital assistant, or a personal computer (PC).

6. The device according to claim 1, wherein the device comprises a touch sensor and a pressure-sensitive sensor.

7. The device according to claim 1, wherein when the position of the contact is moved in a predetermined direction while the pressure is maintained to exceed the first threshold, the circuitry determines the selected object.

8. The device according to claim 1, wherein the display is controlled to display the additional view in the second manner when, during a time the additional view in the first manner is being displayed, the pressure of the contact is detected to exceed the second threshold.

9. The device according to claim 1, wherein the circuitry controls the display the additional view in the first manner when the pressure of the contact is detected to exceed the first threshold without consideration of whether or not the pressure of the contact exceeds the second threshold.

10. The device according to claim 1, wherein a selectable functionality is provided by the first manner of displaying the additional view, the second manner is different than the first manner and provides functionality different than the selectable functionality provided by the first manner of displaying the additional view.

11. An input method, comprising:
    displaying a plurality of objects on a display;
    detecting a position and pressure of a contact;
    selecting one object of the plurality of objects based on the position of the contact;
    controlling the display to display an additional view related to the selected object in a first manner, if the pressure exceeds a first threshold, wherein the additional view is enlarged corresponding to an amount of the pressure in the first manner; and
    controlling the display to display the additional view in a second manner and controlling a vibration device to apply a haptic feedback, if the pressure exceeds a second threshold,
    wherein the vibration device is controlled to not apply the haptic feedback prior to the pressure exceeding the second threshold.

12. The input method according to claim 11, further comprising:
    determining that a determination of the selected object is performed at any of a timing when the pressure is judged as not being detected, a timing when the pressure is judged as being equal to or less than a determination threshold value which is less than the first threshold, and a timing when a predetermined time elapses after the pressure is judged as being equal to or less than the determination threshold value.

13. The input method according to claim 11, wherein the display is controlled to vary a displaying state of the selected object, in correspondence with variation of the detected pressure of the contact.

14. The input method according to claim 11, wherein the display is embodied within a portable device.

15. The input method according to claim 14, wherein the portable device is a cellular phone, a portable music player, a personal digital assistant, or a personal computer (PC).

16. The input method according to claim 11, wherein the selected object is determined when the position of the contact is moved in a predetermined direction while the pressure is maintained to exceed the first threshold.

17. The input method according to claim 11, wherein the display is controlled to display the additional view in the second manner when, during a time the additional view in the first manner is being displayed, the pressure of the contact is detected to exceed the second threshold.

18. The input method according to claim 11, wherein the display is controlled to display the additional view in the first manner when the pressure of the contact is detected to exceed the first threshold without consideration of whether or not the pressure of the contact exceeds the second threshold.

19. A non-transitory computer-readable medium having embodied thereon a program, which when executed by a computer causes the computer to execute a method, the method comprising:

displaying a plurality of objects on a display;

detecting a position and pressure of a contact;

selecting one object of the plurality of objects based on the position of the contact;

controlling the display to display an additional view related to the selected object in a first manner, if the pressure exceeds a first threshold, wherein the additional view is enlarged corresponding to an amount of the pressure in the first manner; and controlling the display to display the additional view in a second manner and controlling a vibration device to apply a haptic feedback, if the pressure exceeds a second threshold, wherein the vibration device is controlled to not apply the haptic feedback prior to the pressure exceeding the second threshold.

* * * * *